United States Patent [19]

Kato et al.

[11] Patent Number: 5,194,194
[45] Date of Patent: Mar. 16, 1993

[54] METHOD FOR MOLDING SOFT SHEET MATERIAL

[75] Inventors: Takashi Kato; Keizo Ito; Hikaru Andoh; Shoji Sakaida, all of Inazawa, Japan

[73] Assignee: Toyoda Gosei Co., Ltd., Nishikasugai, Japan

[21] Appl. No.: 766,083

[22] Filed: Sep. 27, 1991

[30] Foreign Application Priority Data

Sep. 28, 1990 [JP] Japan .................. 2-261988
Feb. 18, 1991 [JP] Japan .................. 3-46080

[51] Int. Cl.$^5$ .................. B29C 51/10; B29C 51/14
[52] U.S. Cl. .................. 264/37; 264/510; 264/512; 264/513; 427/195; 427/197; 427/244
[58] Field of Search .................. 264/37, 510, 512, 514, 264/131, 134, DIG. 1, DIG. 14, 511, 544, 161, 553; 425/503, 504; 427/195, 197, 244; 156/245

[56] References Cited

U.S. PATENT DOCUMENTS

| | | | |
|---|---|---|---|
| 3,676,537 | 7/1972 | Winstead | 264/DIG. 14 |
| 3,737,496 | 6/1973 | Voorhees | 264/544 |
| 4,327,052 | 4/1982 | Sauer | 264/512 |
| 4,778,551 | 10/1988 | Coffman | 264/512 |
| 4,800,102 | 1/1989 | Takada | 427/197 |
| 4,950,500 | 8/1990 | Kauffman et al. | 427/197 |

FOREIGN PATENT DOCUMENTS

| | | | |
|---|---|---|---|
| 51-070236 | 6/1976 | Japan | 427/197 |
| 52-027203 | 7/1977 | Japan | 427/197 |
| 62-053820 | 3/1987 | Japan | 264/131 |

Primary Examiner—Jan H. Silbaugh
Assistant Examiner—Catherine Timm
Attorney, Agent, or Firm—Cushman, Darby & Cushman

[57] ABSTRACT

A method of molding soft sheet material having a foam layer and a skin layer. In the method, a skin powder is sprinkled on a predetermined area of the foam layer for forming the skin layer. The predetermined area is such that when the molded product is produced, the only waste material needing to be removed is foam layer. Therefore, the method enables recycling of the waste material and provides an increased yield.

9 Claims, 11 Drawing Sheets

(PRIOR ART)

FIG.19

(PRIOR ART)

FIG.20

(PRIOR ART)

METHOD FOR MOLDING SOFT SHEET MATERIAL

BACKGROUND OF THE INVENTION

1. Field of the Invention

The present invention relates to a method for molding soft sheet material which provides increased yield and enables waste material to be recycled.

2. Description of the Related Art

Soft sheet materials are used broadly as ornamental material such as a typical automobile pillar (see FIG. 9 described later) and the like.

Figure 18:
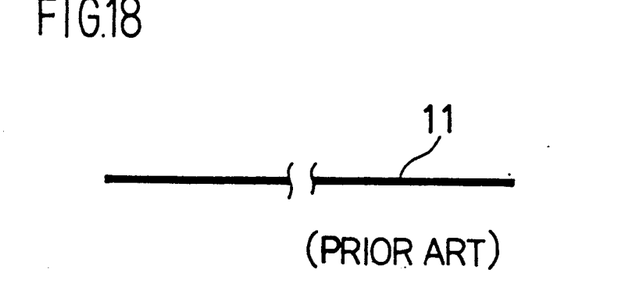
FIGS. 18 through 20 are explanatory views of conventional method for molding soft sheet material.
Figure 19:
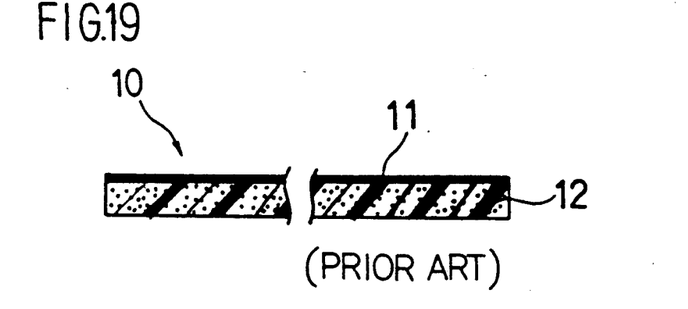
Figure 20:
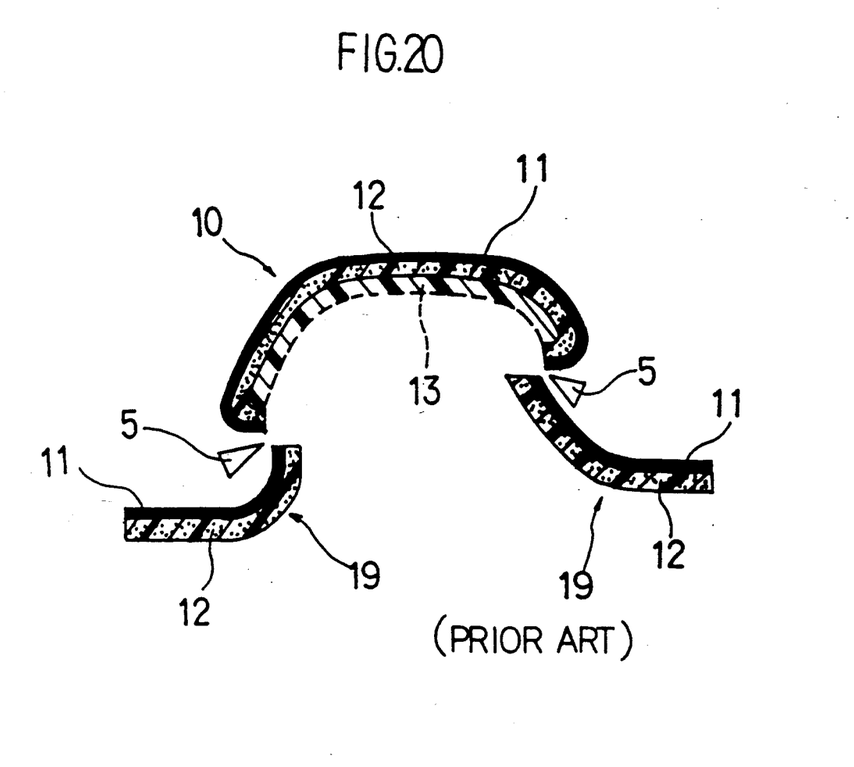

FIGS. 18-20 are explanatory views for describing a conventional method of molding soft sheet material.

The soft sheet material 10 is composed of a skin layer 11 on a foam layer or foam sheet 12 as shown in FIGS. 19 and 20.

The skin layer, shown exclusively in FIG. 18 is formed of sludge skin or the like. The foam layer 12 formed of urethane resin or vinyl chloride resin is injected and insert molded to the back surface of skin layer 11 to produce the soft sheet material 10 shown in FIG. 19.

After molding soft sheet material 10 into a particular shape such as an automobile pillar, a waste part 19 is cut off and removed by a trimming device 5 such as a hot knife as shown in FIG. 20.

After molding and cutting, a base layer 13 formed of hard urethane resin or acrylonitrilebutadiene-styrene (ABS) resin may be injected or insert molded to the back surface of foam layer 12.

The conventional method, however, has the problem that since the waste part 19 is a combination of skin layer 11 and foam layer 12 heat fused together, the layers cannot be separated after molding. Therefore, foam layer 12 and skin layer 11 cannot be recycled and used for reproduction individually, resulting in decreased yield.

SUMMARY OF THE INVENTION

In view of foregoing, it is an object of the present invention to provide a method for molding soft sheet material which allows recycling of waste material and increased yield.

The objectives of the present invention are achieved by producing a soft sheet material composed of a foam layer and a skin layer by the method steps of cutting a foam sheet into a shape necessary for forming a molded product, sprinkling skin powder over a predetermined area of the foam sheet for forming a skin layer, heating the skin powder and foam sheet to melt the skin powder on the foam sheet and soften the foam sheet, vacuum molding the softened foam sheet, and removing foam sheet not having a skin layer as waste material to obtain a molded product.

Other features and advantages of the present invention will be apparent from the following description and accompanying drawings.

BRIEF DESCRIPTION OF THE DRAWINGS

FIGS. 1 through 8 illustrate a method for molding soft sheet material in accordance with a first example (Example 1).

FIGS. 9 and 10 show the method for molding soft sheet material in accordance with a second example (Example 2).

FIGS. 11 through 17 show a method for molding soft sheet material in accordance with a third example (Example 3).

DETAILED DESCRIPTION OF THE PRESENTLY PREFERRED EXEMPLARY EMBODIMENTS

Figure 1:
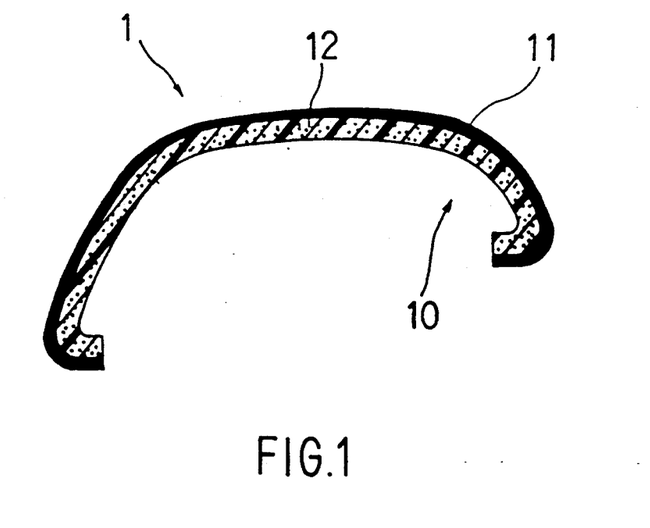
FIG. 1 is a sectional view of a molded product formed of soft sheet material.

FIG. 1 is a sectional view of a molded product formed of soft sheet material 10 using a method of the present invention. Soft sheet material 10 is composed of a foam sheet 12 and skin layer 11. Foam sheet 12 is formed of resin such as polyvinyl chloride resin, polypropylene resin, polyurethane resin and the like.

The skin layer 11 is formed through heat deposition of skin powder. Skin layer 11 is composed of thermoplastic resin such as polyvinyl chloride resin, polypropylene resin and the like.

Foam sheet 12 is cut into the desired shape defined by the product to be molded. Then skin powder for forming skin layer 11 is sprinkled over a predetermined area of foam sheet 12.

As described in the following Examples, prior to sprinkling the skin powder, an adhesive may be applied on the predetermined area of the foam sheet so as to bond the foam sheet and skin powder together. Then the above foam sheet with skin powder is heated and vacuum molded. The molded product is drawn out of the vacuum mold to be cut into the shape defined by the product.

In this invention, the skin powder for forming skin layer 11 is sprinkled over only a predetermined area of the foam sheet surface. The predetermined area and the amount of skin powder sprinkled is such that when the molded product is produced no skin layer will need to be removed as waste material. Only enough skin layer for forming the molded product is produced. Therefore, the predetermined area is defined by the molded product to be produced. The skin powder may be sprinkled over an area greater than the predetermined area for some margin of error.

Thus the skin layer is fused on the foam sheet within a required range necessary for producing the molded product. When cutting the product obtained from vacuum molding into the shape of finished product, the material is cut off along the contour of the above-formed skin layer. The waste material cut off is composed of foam sheet material only, which is available for recycling.

When cutting off the waste material to obtain the molded product, the waste part which is removed (i.e., clamp margin or extension margin described later) is composed of foam sheet only. The waste foam sheet can be recycled through heating and melting, thus the use of foam material is economized. Since the skin powder can be sprinkled over the required range or predetermined area only, the use of skin powder is economized. Economization of materials results in increased product yield.

As described, the present invention provides a method for molding soft sheet material having increased yield and enables waste material to be recycled.

EXAMPLE 1

The method for molding soft sheet material with respect to FIGS. 1 through 8 is described.

This example relates to the method for producing a molded product 1, shown in FIG. 1, of a soft sheet material 10 composed of a skin layer 11 and a foam layer 12.

Figure 2:
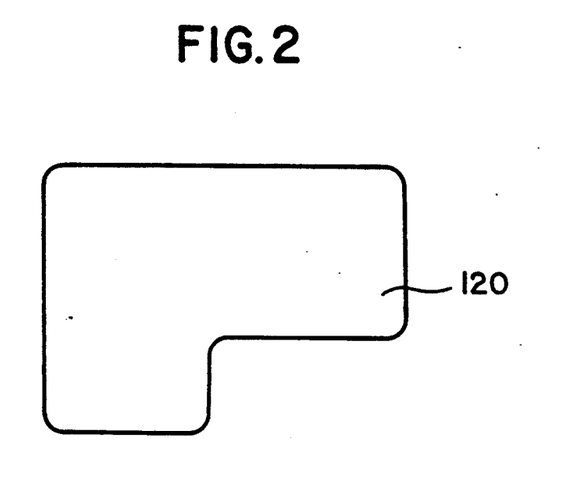
FIG. 2 shows an example piece of foam sheet cut into a shape for forming a molded product.

A foam sheet 120, shown in FIG. 2, is cut into a shape defined by product 1.

Figure 3:
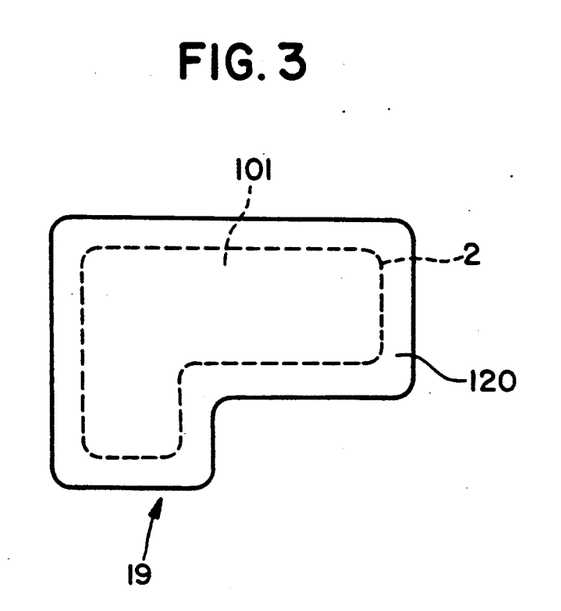
FIG. 3 shows the predetermined area on the foam sheet on which skin powder is sprinkled.

As shown in FIG. 3, a skin powder material 101 for forming the skin layer is sprinkled over a predetermined area 2 on the surface of foam sheet 120.

Figure 4:
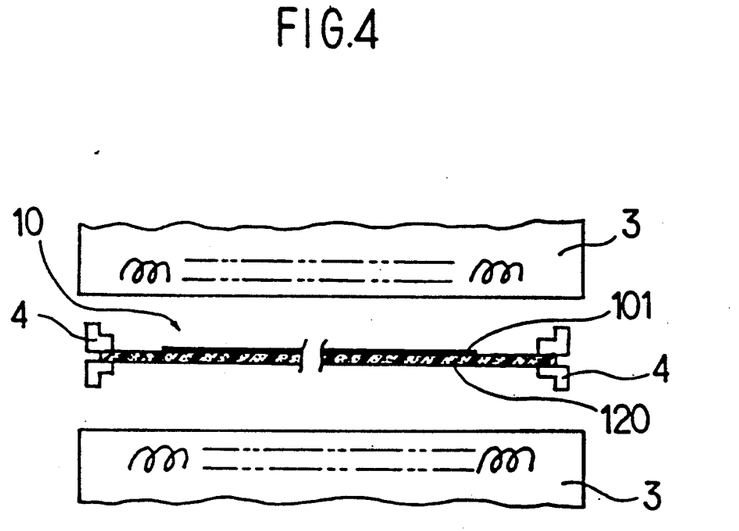
FIG. 4 shows the heating of the foam sheet sprinkled with skin powder.

As shown in FIG. 4, both ends of the foam sheet 120 with skin powder 101 sprinkled thereon are clamped with clamps 4. The area of foam sheet 120 clamped is referred to as the clamp margin, and the area of foam sheet 120 not covered by skin powder 101 or in the clamp margin is referred to as the extension margin. The foam sheet is heated to be softened by a heater 3, and skin power 101 is fused to form the skin layer 11 on foam sheet 120.

Figure 5:
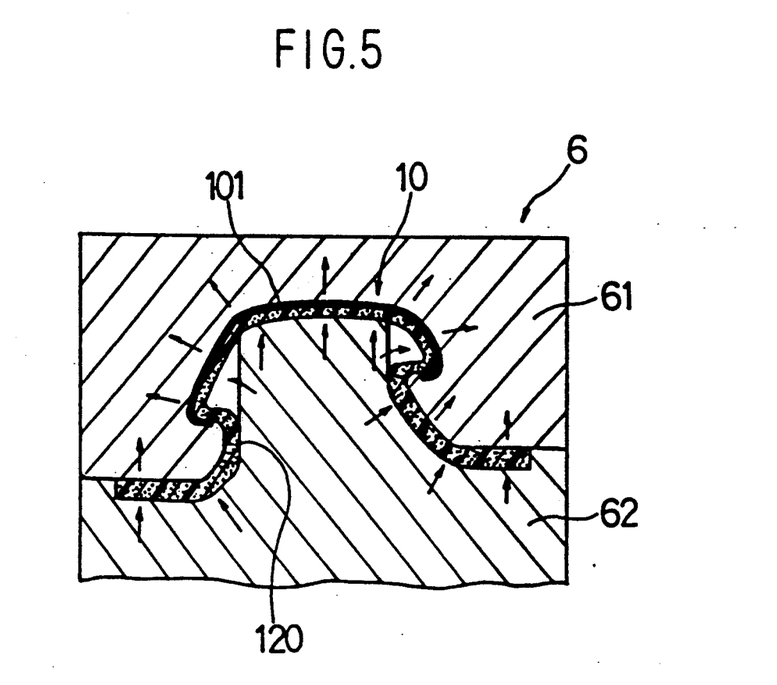
FIG. 5 shows the vacuum molding of the heated foam sheet.

The above softened foam sheet 120 is placed within a vacuum mold 6 and vacuum molded as shown in FIG. 5.

Figure 6:
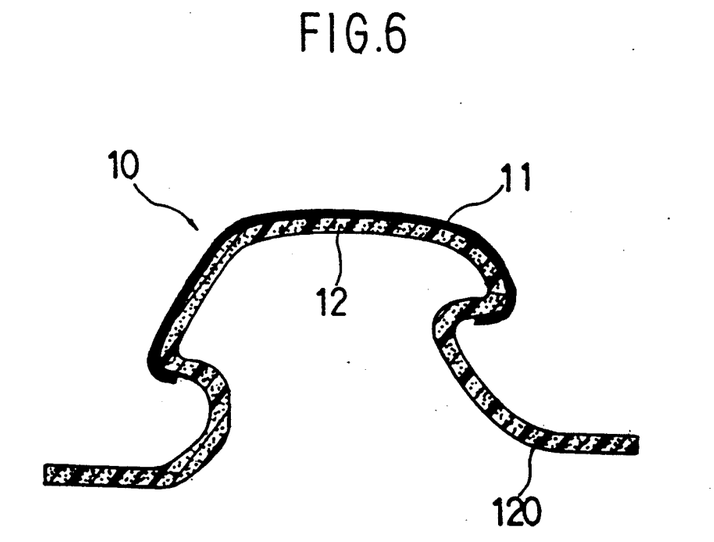
FIG. 6 shows the drawn vacuum molded foam sheet.

FIG. 6 shows the molded product drawn out of vacuum mold 6.

Figure 7:
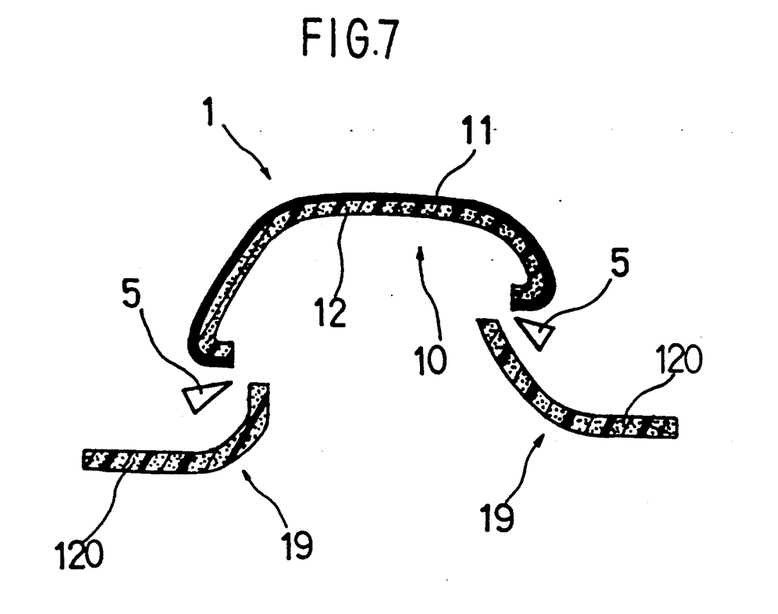
FIG. 7 show the removal of foam sheet as a waste product.

Then as shown in FIG. 7, the waste part is cut off to obtain finished product 1.

In the above example, foam sheet 120 may be a sheet of polypropylene resin expanded about 7-20 times, and skin powder 101 may be a polypropylene resin powder.

An adhesive (not shown) can be applied on predetermined area 2 of the surface of foam sheet 120 for bonding skin layer 11 to foam sheet 120. The adhesive causes skin powder 101 to adhere only to the predetermined area 2 defined by the product 1.

Vacuum mold 6 shown in FIG. 5 consists of an upper mold 61 and a lower mold 62. Upper mold 61 is a vacuum mold of a porous air permeability type, from which pressure is decreased through outside suction force. Upper mold 61 forms the soft sheet material 10 into the desired shape of product 1. Lower mold 62 is of plug, air permeability type which pressurizes the air from the lower side of soft sheet material 10.

Figure 9:
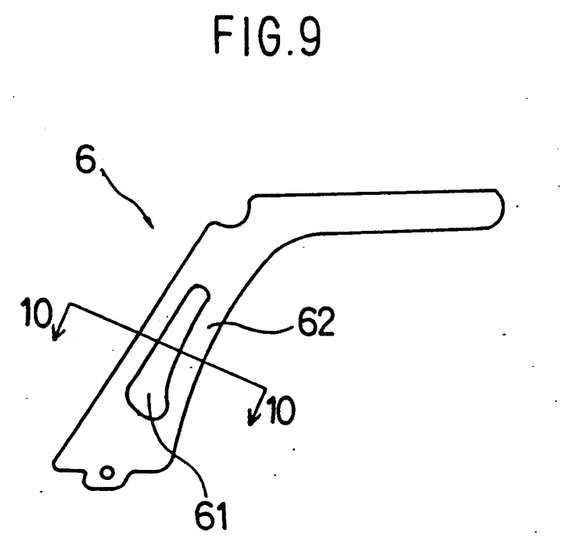
FIG. 9 is an elevational view of a typical automobile pillar.

Molded product 1 drawn out of vacuum mold 6 as shown in FIGS. 6 and 7 is cut into the required shape with a trimming device 5. Only the part of foam sheet 120 with no skin layer formed thereon is cut off. The above obtained product 1 is used as an exterior member for an automobile pillar as shown in FIG. 9.

In order to obtain a finished product, foam sheet 120 is cut along the contour defined by skin layer 11 with the trimming device 5. When cutting the molded product into a finished shape, the trimmed waste part 19; (clamp and extension margin) is composed of foam sheet 120 only. Since the waste part 19 is composed of polypropylene resin only, the waste part 19 can be heated and melted to be recycled for thermoplastic resin (i.e. polypropylene resin) and the foam sheet is economized.

Since skin powder 101 for forming the skin layer is only sprinkled over predetermined area 2 of foam sheet 120 defined by product 1, no skin layer 11 is removed as waste material, and the use of skin powder is economized.

Therefore foam sheet 120 and skin powder 101 are economized and product yield is increased.

This example provides a method for molding soft sheet material which increases the product yield and enables the waste material to be recycled.

Figure 8:
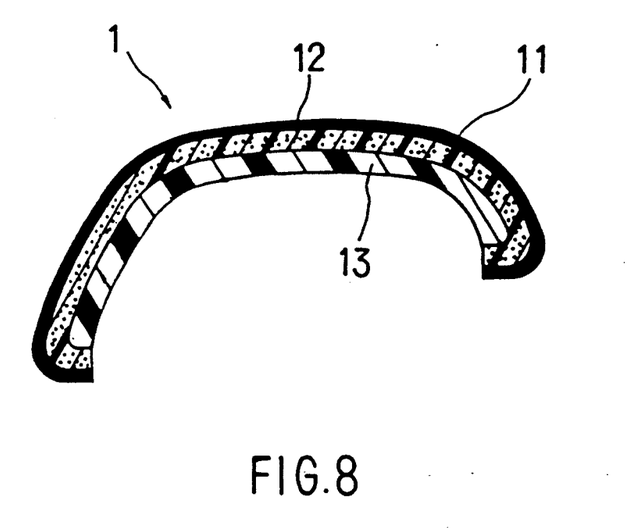
FIG. 8 is a sectional view of the molded product composed of the soft sheet material with a base layer produced by the method in explanatory FIGS. 2 through 7.

A base layer 13 of polypropylene resin may be insert molded into foam layer 12 of the molded product 1 through injection molding and the like, the result of which is shown in FIG. 8. Base layer 13 enables molded product 1 to keep its shape securely.

EXAMPLE 2

Figure 10:
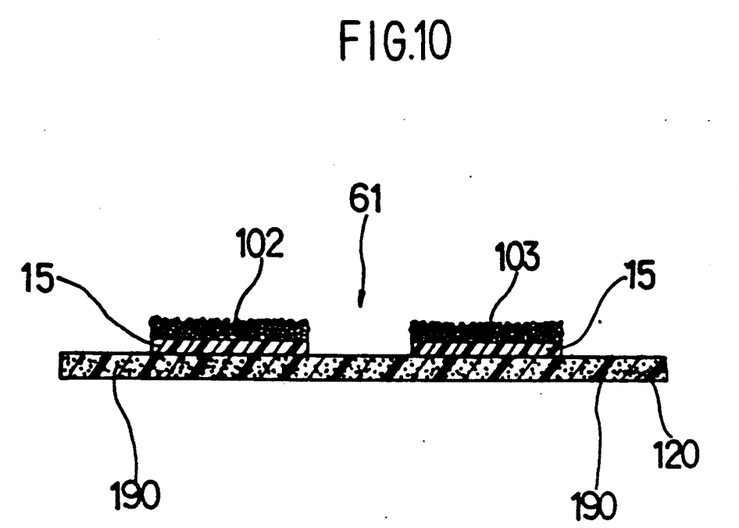
FIG. 10 is a cross sectional view of FIG. 9 along line 10—10 of a typical automobile pillar produced by the method described in Example 2.

The method for molding soft sheet material for a typical automobile pillar is described with respect to FIGS. 9 and 10.

This example relates to a pillar having a part provided with no skin layer. Instead of skin powder 101 of Example 1, skin powder 102 and 103 is sprinkled onto two separate parts, respectively.

The pillar 6 to be obtained through the molding of soft sheet material has a dog-legged shaped exterior member 62, as shown in FIG. 9, with an opening 61 at the center of the lower part thereof.

An adhesive 15 is applied on predetermined areas of a foam sheet 120. The adhesive is specifically not applied to the part of foam sheet 120 corresponding to opening 61 of pillar 6 and clamp margins 190 as shown in FIG. 10.

Then the skin powder 102 and 103 is sprinkled over the predetermined areas where the adhesive 15 has been applied for bonding skin powder 102 and 103 to foam sheet 120.

Skin powder 102 and 103 is heated and melted on foam sheet 120, and foam sheet 120 is heated to a softened state. The softened foam sheet 120 is placed within a vacuum mold to be vacuum molded. Then the molded product is trimmed into a shape defined by the finished product. At the same time, the part corresponded to opening 61 is also trimmed.

As shown in FIG. 9, the molded product of the soft sheet material provided with opening 61 at the center thereof is obtained.

According to this example, no skin layer is formed on the waste part such as opening 61 and clamp margin 190. Only the part of foam sheet 120 with no skin layer 11 formed thereon is cut off as waste for recycling. Thus, the production yield is improved and materials are economized.

EXAMPLE 3

As shown in FIGS. 11 through 17, this example shows a method for molding soft sheet material in which more skin powder is sprinkled over deep drawing parts, parts where the skin layer thickness becomes thinner at molding, i.e., CU1 and CU2.

Figure 11:
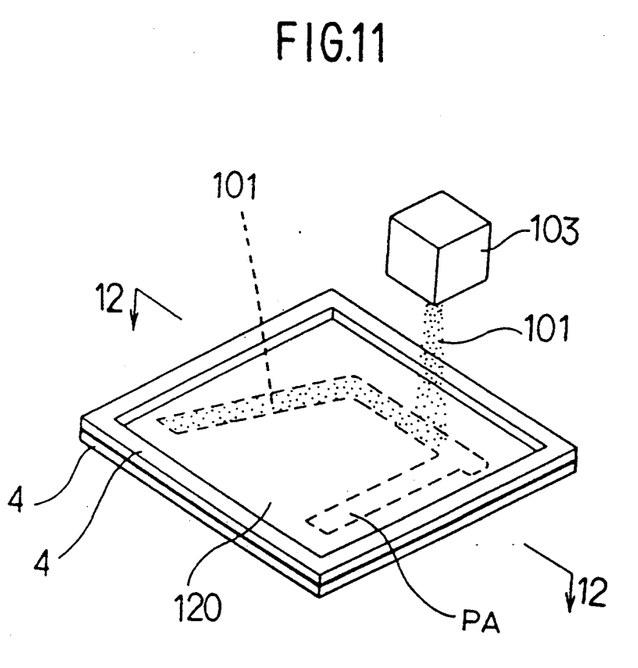
FIG. 11 is a perspective view of the foam sheet with skin powder sprinkled thereon.
Figure 17:
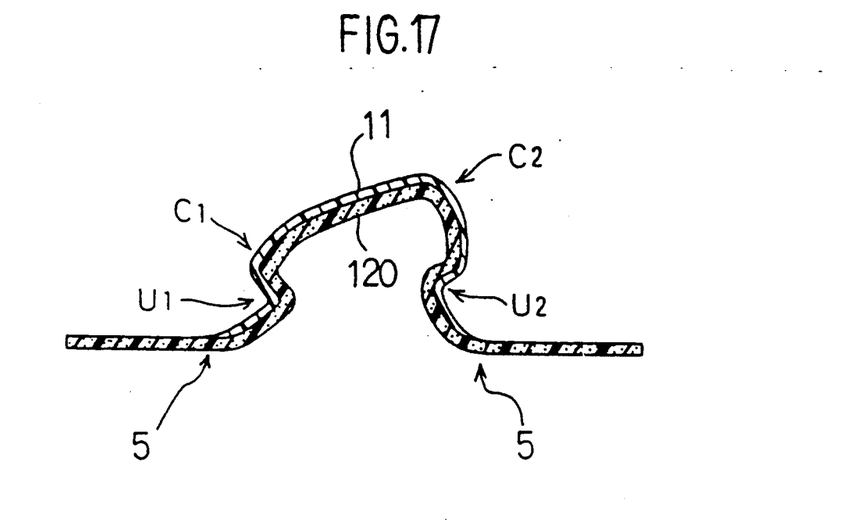
FIG. 17 is a sectional view of the molded product.

As shown in FIG. 11, foam sheet 120 is prepared. Skin powder 101 is sprinkled over a predetermined area of foam sheet 120 by a powder sprinkler 103. In this example the molded product to be obtained is shown in FIG. 17. In FIG. 11 the dashed line shows the product area (PA) on the foam sheet 120.

Figure 12:
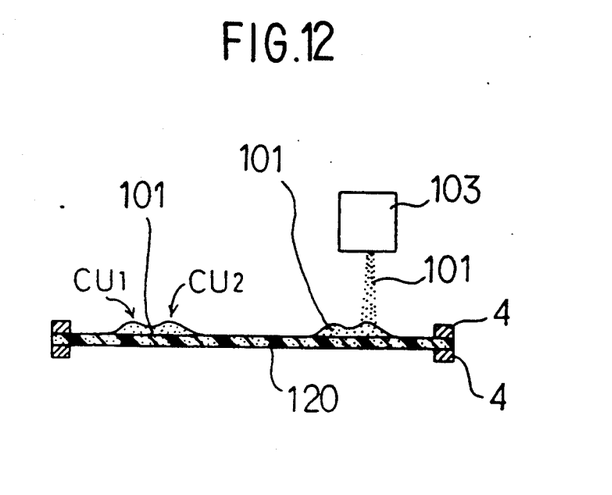
FIG. 12 is a cross sectional view of FIG. 11 along line 12—12.

FIG. 12 is a cross sectional view of FIG. 11 along line 12—12. Powder sprinkler 103, movable in two-dimensions sprinkles a predetermined amount of skin powder 101 onto the product area PA. Shown in FIG. 12, more skin powder 101 is accumulated on peak and undercut portions (hereinafter referred to as "deep drawings") CU1 and CU2. It is preferable to accumulate skin powder 101 on deep drawings CU1 and CU2 to a thickness of about 1.5 mm-2.0 mm, and about 0.5 mm-1.0 mm on the other parts.

To accumulate a desired amount of skin powder 101, powder sprinkler 103 is controlled by a control program input to a controller (not shown). By controlling the travel path and speed of sprinkler 103 the required amount of skin powder 101 is accumulated on foam sheet 120.

Figure 13:
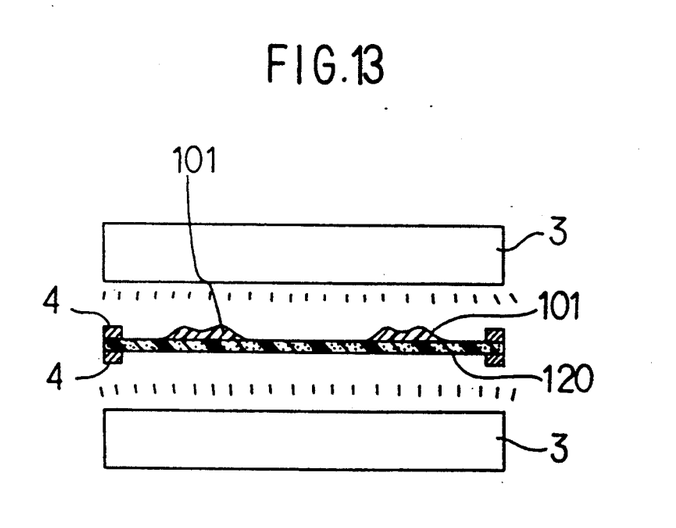
FIG. 13 is an explanatory view of a heating process of the foam sheet shown in FIG. 12.

After sprinkling skin powder 101, powder sprinkler 103 is withdrawn and a heater 3 moves above foam sheet 120, (see FIG. 13). Skin powder 101 is heated and melted by heater 3 to form skin layer 11. At the same time foam sheet 120 is heated to a softened state.

The thickness of the skin layer 11 at the deep drawings CU1 and CU2 is kept thicker than that of other parts. For example, the thickness of the deep drawing parts CU1 and CU2 is about 1.2 mm-1.6 mm and other parts are about 0.4 mm-0.8 mm.

It is preferable to make foam sheet 120 of material with continuous bubble which allows air to flow from the lower surface thereof, thus an air layer is not formed between melted skin layer 11 and foam sheet 120 during heating.

Figure 14:
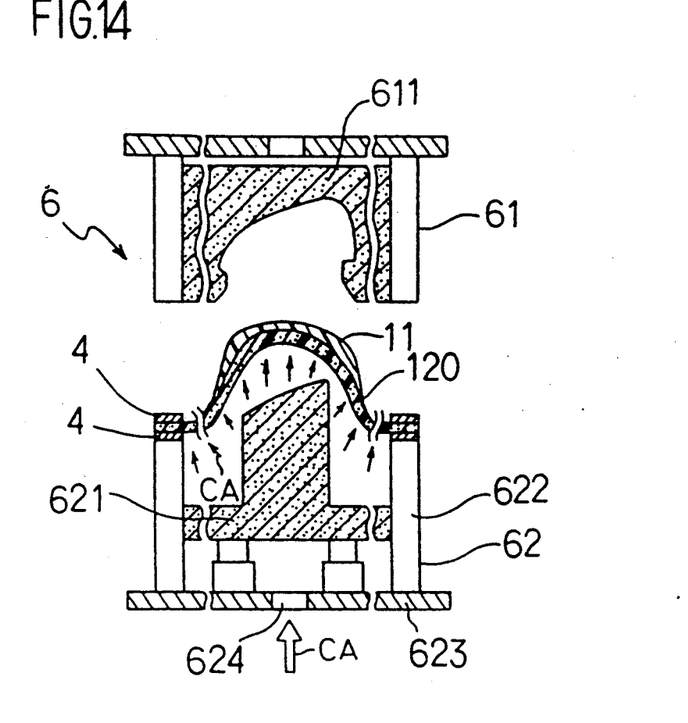
FIGS. 14 through 16 are sectional views of the molding process.
Figure 15:
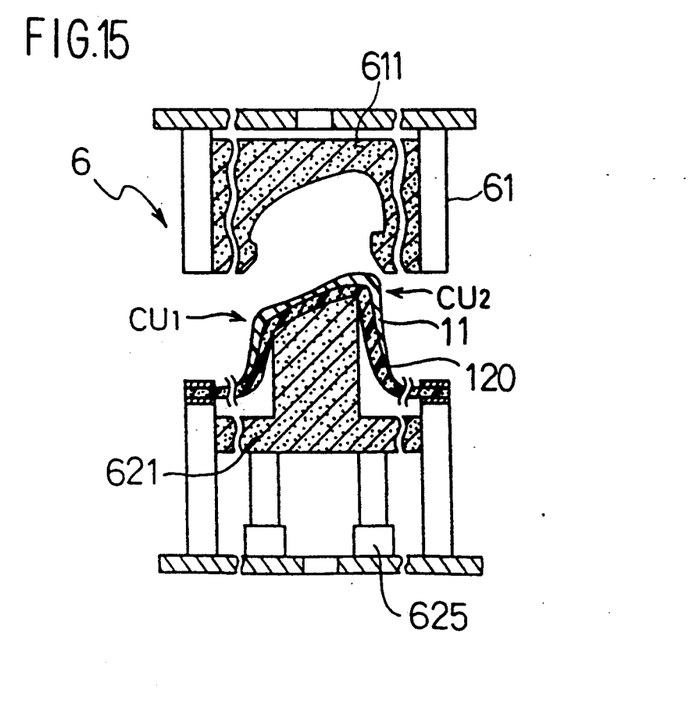
Figure 16:
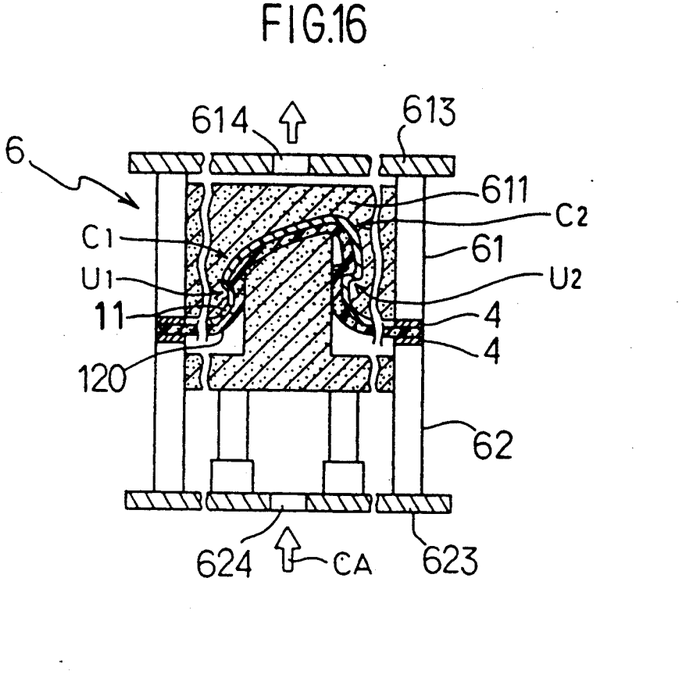

After heating, heater 3 is withdrawn, and the vacuum mold 6 moves above and under foam sheet 120. FIGS. 14 through 16 are explanatory views showing the vacuum molding process. In these drawings, the peripheral of the part to be molded is enlarged for reference.

As shown in FIG. 14, upper mold 61 and lower mold 62 have an upper die 611 and lower die 621 of porous type, respectively. Foam sheet 120 held by clamp 4 is secured on a support base 622 of lower mold 62. A bottom plate 623 has an air hole 624. Compressed air CA supplied from a compressed air supplier (not shown) is blown through air hole 624 and into the part under lower die 621. The compressed air CA penetrates the lower die 621 of porous type to press foam sheet 120 upward. Foam sheet 120 and the skin layer 10 spread slightly and are thinned by penetrating compressed air.

As shown in FIG. 15, when the lower die 621 is pressed upward by a hydraulic cylinder 625, skin layer 11 spreads, further affecting deep drawings CU1 and CU2.

As shown in FIG. 16, foam sheet 120 and the skin layer 11 are interposed by lowering upper mold 61 and securing upper and lower clamps 4 between molds 61 and 62. At this time, the compressed air CA is still supplied through lower air hole 624 of lower mold 62 and the inside of upper mold 61 is evacuated through upper air hole 614 in top plate 613 of upper mold 61.

Foam sheet 120 and skin layer 11 are formed according to the configuration of upper die 611 of porous type. Vacuum mold 6 has an upper die 611 of recess type, and upper die 611 has an inversion crimp pattern on its surface to form the same pattern on the surface of skin layer 11.

The molded product is then drawn from vacuum mold 6, and parts of foam sheet 120 except for product area PA shown in FIG. 12 are cut off by a trimming device 5, resulting in a finished product.

FIG. 17 is a sectional view of the molded product of soft sheet material before trimming. Upon vacuum molding, the peak parts C1, C2 and undercut parts U1, U2 received stronger tensile force than other parts. However since more skin powder 101 was accumulated thicker on these parts than other parts, to cope with such force, the thickness of skin layer 11 of the product becomes almost uniform.

According to this example, since more skin powder 101 is accumulated on the deep draw parts than other parts heated for molding, the skin layer 11 of the product has uniform thickness.

Once again only foam sheet will be removed as waste thus economizing use of materials and increasing yield.

While the invention has been described with reference to the examples, it is to be understood that modifications or variations may be easily made by a person of ordinary skill in the art without departing from the scope of this invention which is defined by the appended claims.

What is claimed is:

1. A method of molding soft sheet material comprising the steps of:
   cutting a foam sheet into a shape necessary for forming a molded product;
   sprinkling a skin powder onto a surface of said foam sheet;
   heating said foam sheet sprinkled with skin powder to melt said skin powder on said foam sheet to form a skin layer and soften said foam sheet;
   placing said softened foam sheet with said skin layer in a vacuum mold;
   vacuum molding said foam sheet with said skin layer into a predetermined configuration corresponding to said molded product using a vacuum mold;
   drawing the vacuum molded, foam sheet with said skin layer out of said vacuum mold; and
   removing waste material to obtain said molded product; said waste material composed of foam sheet with no skin layer;
   said sprinkling step including limiting said sprinkling to a predetermined area which covers said foam sheet surface only to an extent that corresponds to an entire surface of the molded product so that when the skin layer is formed, the skin layer will not cover portions of the foam sheet surface removed as waste in the formation of the molded product.

2. A method as in claim 1, wherein said foam sheet is a synthetic resin selected from the group consisting of polyvinyl chloride resin, polypropylene resin, and polyurethane resin.

3. A method as in claim 1, wherein said skin powder is a thermoplastic resin selected from the group consisting of polyvinyl chloride resin, and polypropylene resin.

4. A method as in claim 1, wherein an adhesive is applied over said predetermined area of said foam sheet prior to sprinkling said skin powder for bonding said skin powder to said foam sheet.

5. A method as in claim 1, wherein said waste material is recycled.

6. A method as in claim 1, wherein said skin powder is sprinkled over a plurality of predetermined areas of said foam sheet wherein said plurality of predetermined areas are such that only skin layer sufficient to cover the entire surface of said molded product is produced and the waste material only includes foam sheet.

7. A method as in claim 1, wherein in said sprinkling step skin powder is accumulated thicker on said foam sheet corresponding to deep drawing parts where said skin layer is thinned during said vacuum molding step.

8. A method as in claim 1, wherein said vacuum molding step is performed by introducing pressurized air into a lower mold of plug type accommodating said foam sheet, and reducing said air pressure from an upper mold of porous type defining said predetermined configuration.

9. A method of molding soft sheet material comprising the steps of:
cutting a foam sheet into a shape necessary for forming a molded product;
sprinkling a skin powder onto a surface of said foam sheet;
heating said foam sheet sprinkled with skin powder to melt said skin powder on said foam sheet to form a skin layer and soften said foam sheet;
placing said softened foam sheet with said skin layer in a vacuum mold;
vacuum molding said foam sheet with said skin layer into a predetermined configuration corresponding to said molded product using a vacuum mold;
drawing the vacuum molded, foam sheet with said skin layer out of said vacuum mold; and
removing waste material to obtain said molded product; said waste material composed of foam sheet with no skin layer;
said sprinkling step including limiting said sprinkling to a predetermined area which covers said foam sheet surface only to an extent that corresponds to an entire surface of the molded product so that when the skin layer is formed, the skin layer will not cover portions of the foam sheet surface removed as waste in the formation of the molded product; and
further including insert molding a base layer to said vacuum molded foam sheet with said skin layer.

* * * * *